(12) United States Patent
Azuma et al.

(10) Patent No.: US 7,746,419 B2
(45) Date of Patent: Jun. 29, 2010

(54) LIQUID CRYSTAL DISPLAY DEVICE

(75) Inventors: Yuji Azuma, Fujisawa (JP); Shimon Itakura, Mobara (JP)

(73) Assignees: IPS Alpha Technology, Ltd., Chiba-ken (JP); Hitachi Display Devices, Ltd., Chiba-ken (JP)

( * ) Notice: Subject to any disclaimer, the term of this patent is extended or adjusted under 35 U.S.C. 154(b) by 0 days.

(21) Appl. No.: 12/457,448

(22) Filed: Jun. 11, 2009

(65) Prior Publication Data

US 2009/0256990 A1 Oct. 15, 2009

Related U.S. Application Data

(63) Continuation of application No. 12/071,540, filed on Feb. 22, 2008, now Pat. No. 7,564,516.

(30) Foreign Application Priority Data

Feb. 22, 2007 (JP) ............................. 2007-041608

(51) Int. Cl.
*G02F 1/1335* (2006.01)
*H01R 33/02* (2006.01)
*F21S 4/00* (2006.01)

(52) U.S. Cl. ..................... 349/58; 349/61; 362/225; 362/382; 362/658; 439/235

(58) Field of Classification Search ............. 349/56, 349/58, 61, 70; 362/225, 382, 632, 647, 362/658; 439/235
See application file for complete search history.

(56) References Cited

U.S. PATENT DOCUMENTS

| 7,246,934 B2 | 7/2007 | Jeong |
| 2003/0112626 A1 | 6/2003 | Yoo et al. |

*Primary Examiner*—Frank G Font
*Assistant Examiner*—Michael P Mooney
(74) *Attorney, Agent, or Firm*—Stites & Harbison PLLC; Juan Carlos A. Marquez, Esq.

(57) ABSTRACT

A liquid crystal display device of the present invention includes a liquid crystal display panel, and a backlight arranged on a back surface of the liquid crystal display panel. The backlight includes a plurality of rod-shaped light sources, electrode fittings for holding the rod-shaped light sources, and side wall plates covering the electrode fittings. The electrode fittings are connected to a connection portion extending in the parallel-arrangement direction of the rod-shaped light sources. The side wall plate includes a plurality of projecting members arranged in parallel to each other in the extending direction of the connection portion. The connection portion includes positions which are brought into contact with the projecting members and portions which are not brought into contact with the projecting members. By adopting the above-mentioned constitution, the liquid crystal display device can reduce squeals and the like.

6 Claims, 6 Drawing Sheets

LIQUID CRYSTAL DISPLAY DEVICE

CROSS-REFERENCE TO RELATED APPLICATION

This application is a Continuation application of U.S. application Ser. No. 12/071,540 filed Feb. 22, 2008 now U.S. Pat. No. 7,564,516. Priority is claimed based on U.S. application Ser. No. 12/071,540 filed Feb. 22, 2008, which claims the priority to Japanese Patent Application No. 2007-041608 filed on Feb. 22, 2007, the content of which is hereby incorporated by reference into this application.

BACKGROUND OF THE INVENTION

1. Field of the Invention

The present invention relates to a liquid crystal display device, and more particularly to a liquid crystal display device having a so-called direct-type backlight.

2. Description of the Related Art

With respect to a liquid crystal display device, along with a demand for large-sizing of a liquid crystal display panel, as a backlight, a direct-type backlight which can make a planar light source uniform has been used.

In such a backlight, in a plane of a base having a light reflection function which faces the liquid crystal display panel in an opposed manner, a plurality of fluorescent lamps is arranged in the direction orthogonal to the longitudinal direction of the fluorescent lamps. Further, each fluorescent lamp has electrode portions formed on both ends thereof clamped by electrode fittings and are supported on the base.

Further, for example, the respective electrode fittings which clamp plus-side electrodes on one end side of the respective fluorescent lamps are configured to be connected with each other in common, while the electrode fittings which clamp minus-side electrodes on another side of the fluorescent lamps are also configured to be connected with each other in common.

Due to such a constitution, the respective electrode fittings connected with each other are configured to be mounted on an electrode support member constituted of a strip-shaped conductive member extending in the parallel-arrangement direction of the fluorescent lamps in a relatively elongated manner.

In such a backlight, in a plane of the base having a light reflection function which faces the liquid crystal display panel in an opposed manner, a plurality of fluorescent lamps is arranged in the direction orthogonal to the longitudinal direction of the fluorescent lamps. Each fluorescent lamp has electrode portions formed on both ends thereof clamped by electrode fittings, and the electrode fittings are arranged at both ends of the base.

Further, a plurality of electrode fittings is formed on an electrode support member made of a strip-shaped conductive material extending in the parallel-arrangement direction of the fluorescent lamps. Due to such a constitution, the electrode support member has a function of clamping a plurality of fluorescent lamps.

Accordingly, the plurality of fluorescent lamps in the inside of the backlight is configured to be connected with each other in parallel by means of the electrode support member and the electrode fittings arranged at both ends of the base.

The liquid crystal display device having such a backlight is disclosed in the patent document 1 (JP-A-2005-347259 (US Patent Laid-Open No: US20050265047)), for example.

SUMMARY OF THE INVENTION

However, in the liquid crystal display device having such a constitution, the electrode support member is made of a relatively elongated strip-shaped conductive material and hence, an expansion ratio due to heat from the fluorescent lamps becomes large whereby when the electrode support member is firmly fixed to the base side by a chance, the electrode support member is liable to be easily deflected between these fixed portions.

Accordingly, an attempt has been made to provide the electrode support member constituted such that the electrode support member is relatively loosely fixed to the base to allow the extension of the electrode support member even when the thermal expansion is generated, and the electrode support member is pushed to the base side using projecting portions fixed to the base.

However, when the electrode support member is constituted as described above, it is found that the electrode support member rubs against the projecting portion attributed to the expansion thereof thus generating squeals.

Further, it is also found that when the projecting portions are arranged in a spaced-apart manner from the electrode support member with a small distance therebetween for avoiding the occurrence of the squeals, due to the vibrations of the electrode support member generated by an external source, the electrode support member is brought into contact with the projecting portions thus generating buzzes and rattles.

Accordingly, it is an object of the present invention to provide a liquid crystal display device which can reduce the occurrence of all of these squeals, buzzes and rattles.

To briefly explain the summary of typical inventions among the inventions disclosed in this specification, they are as follows.

(1) The liquid crystal display device according to the present invention includes, for example, a liquid crystal-display panel, and a backlight arranged on a back surface of the liquid crystal display panel. The backlight includes a plurality of rod-shaped light sources arranged in parallel in a plane facing the liquid crystal display panel in an opposed manner, electrode fittings for holding the respective rod-shaped light sources at electrode portions of the respective rod-shaped light sources, and side wall plates covering the electrode portions and the electrode fittings. Further, the rod-shaped light sources, the electrode fittings and the side wall plates are accommodated in and fixed to a lower frame (base).

The electrode fittings support the electrode portions of the rod-shaped light sources, and are connected to the connection portions extending in the parallel-arrangement direction of the rod-shaped light sources. Further, the electrode fittings are arranged at predetermined intervals for arranging the rod-shaped light sources in parallel to each other.

The side wall plate includes a plurality of projecting members along the parallel-arrangement direction of the rod-shaped light sources.

The connection portion includes positions which are brought into contact with the projecting members and portions which are not brought into contact with the projecting members at positions arranged at predetermined intervals in the extending direction of the connection portion.

(2) The liquid crystal display device according to the present invention is, for example, constituted on the premise of the constitution (1), and is characterized in that the projecting member has a crest portion having an arcuate surface at the position where the projecting member faces the connection portion in an opposed manner.

(3) The liquid crystal display device according to the present invention is, for example, constituted on the premise of the constitution (1), and is characterized in that the portions of the connection portion which are brought into contact with the projecting members and the portions of the connection portion which are not brought into contact with the projecting members are arranged at equal intervals in the extending direction of the connection portion.

(4) The liquid crystal display device according to the present invention is, for example, constituted on the premise of the constitution (1), and is characterized in that the connection portion is constituted of a pair of members with the electrode fittings arranged therebetween, and the projecting members are arranged in the extending direction of the connection portion on the respective connection portions.

(5) The liquid crystal display device according to the present invention is, for example, constituted on the premise of the constitution (4), and is characterized in that the portions of the pair of respective connection portions which are brought into contact with the projecting members and the portions of the pair of respective connection portions which are not brought into contact with the projecting members are substantially uniformly distributed in the extending direction of the connection portions, and the portions of another connection portion which face the portions of one connection portion which are not brought into contact with the projecting members constitute portions which are brought into contact with the projecting members.

(6) The liquid crystal display device according to the present invention is, for example, constituted on the premise of the constitution (1), and is characterized in that the projecting members are integrally formed with the side wall plate fixedly arranged on the lower frame.

(7) The liquid crystal display device according to the present invention is, for example, constituted on the premise of the constitution (1), and is characterized in that the side wall plate is arranged in an inclined manner while expanding with an obtuse angle with respect to a surface of the base, and a surface of the side wall plate on a side opposite to a side where the projecting members are formed has a light reflection function.

(8) The liquid crystal display device according to the present invention includes, for example, a liquid crystal display panel, and a backlight arranged on a back surface of the liquid crystal display panel. The backlight includes a plurality of rod-shaped light sources arranged in parallel in a plane facing the liquid crystal display panel in an opposed manner, electrode fittings for holding the respective rod-shaped light sources at electrode portions of the respective rod-shaped light sources, and side wall plates covering the electrode portions and the electrode fittings. Further, the rod-shaped light sources, the electrode fittings and the side wall plates are accommodated in and fixed to a lower frame (base).

The electrode fittings support electrode portions of the rod-shaped light sources, and are connected to the connection portions extending in the parallel-arrangement direction of the rod-shaped light sources. Further, the electrode fittings are arranged at predetermined intervals for arranging the rod-shaped light sources in parallel to each other. The side wall plate includes a plurality of projecting members along the parallel-arrangement direction of the rod-shaped light sources. The number of projecting members is set smaller than the number of intervals between the neighboring electrode fittings, and the projecting members are connected to the connection portion.

Here, the present invention is not limited to the above-mentioned constitution, and various modifications can be made without departing from the technical concept of the present invention.

According to the liquid crystal display device having such a constitution, it is possible to reduce the occurrence of all of squeals, buzzes and rattles.

BRIEF DESCRIPTION OF THE DRAWINGS

FIG. 1A and FIG. 1B are cross-sectional views of an essential part showing one embodiment of a liquid crystal display device according to the present invention, wherein FIG. 1A is a cross-sectional view taken along a line IA-IA in FIG. 8, and FIG. 1B is a cross-sectional view taken along a line IB-IB in FIG. 8;

DESCRIPTION OF THE PREFERRED EMBODIMENT

Hereinafter, an embodiment of a liquid crystal display device according to the present invention is explained in conjunction with drawings.

Figure 2:
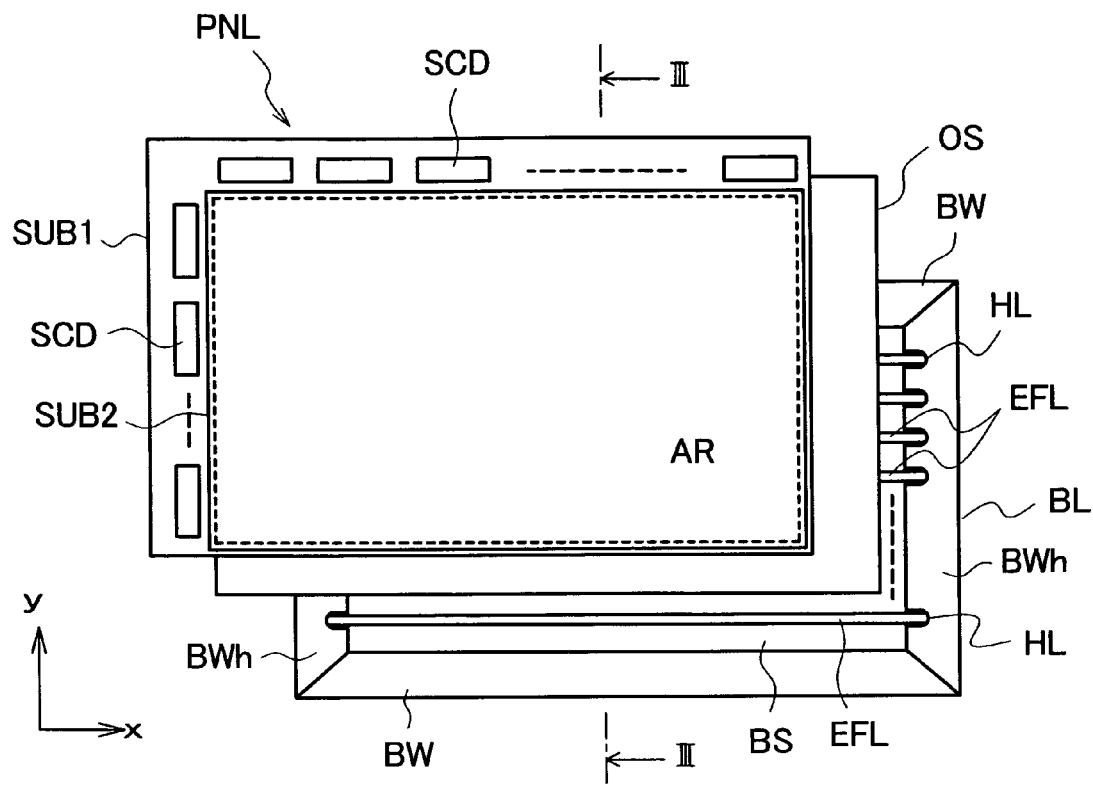
FIG. 2 is an exploded plan view showing the schematic overall constitution of the liquid crystal display device according to the present invention.

FIG. 2 is a schematic constitutional view showing one embodiment of the liquid crystal display device according to the present invention.

First of all, as viewed from a viewer's side, a liquid crystal display panel PNL, an optical sheet OS and a backlight BL are sequentially arranged.

The liquid crystal display panel PNL is configured such that a pair of substrates SUB1, SUB2 which is arranged in parallel and is made of glass, for example, forms an envelope, and liquid crystal is interposed between the respective substrates SUB1, SUB2.

On a liquid-crystal-side surface of the substrate SUB1 or SUB2, pixels arranged in a matrix array (not shown in the drawing) are formed in a state that liquid crystal forms one constitutional element of the pixel, and each pixel can control light transmissivity of the liquid crystal.

Further, a region on which the respective pixels are formed is referred to as a liquid crystal display region AR (a region surrounded by a chained-line frame in the drawing), light from a backlight BL described later is radiated to a whole area of the liquid crystal display region AR, and a viewer is allowed to recognize an image using light which passes through the respective pixels.

Here, the substrate SUB1 arranged on a rear side from a viewer's side has an area larger than an area of the substrate SUB2, and semiconductor devices SCD each of which is formed of a circuit for independently driving the respective pixels are mounted on a periphery of the substrate SUB1 exposed from the substrate SUB2.

On a back surface of the liquid crystal display panel PNL, for example, a backlight BL is arranged by way of an optical sheet OS such as a diffusion sheet, a prism sheet or a stacked body of these sheets. The optical sheet OS is provided for guiding light from the backlight BL to a liquid-crystal-display-panel-PNL side by diffusing or condensing light.

The backlight BL is a so-called direct-type backlight. First of all, the backlight BL includes a lower frame which is formed of a base for supporting a plurality of external electrode fluorescent lamps EFL which has the longitudinal direction thereof aligned with the x direction in the drawing and is arranged in parallel to each other in the y direction in the drawing in a plane thereof arranged parallel to the liquid crystal display panel, for example (indicated by symbol BS in FIG. 3 and FIG. 4). The lower frame BS is, for example, made of metal, and is formed in a box shape. Further, on a front surface of the lower frame BS, a reflection sheet RS having side wall surfaces BW arranged in an inclined manner and formed by respectively bending sides thereof extending in the x direction in the drawing is mounted. Further, at respective side portions of the lower frame BS extending in the y direction in the drawing, for example, side wall plates BWh made of a resin material and possess a light reflecting function on a liquid-crystal-display-panel-PNL-side surface thereof are arranged in an inclined manner.

The side wall plates BWh substantially constitute a side wall portion of the backlight BL together with the side wall surfaces BW of the reflection sheet RS. The constitution of the backlight BL is described in further detail later.

Figure 3:
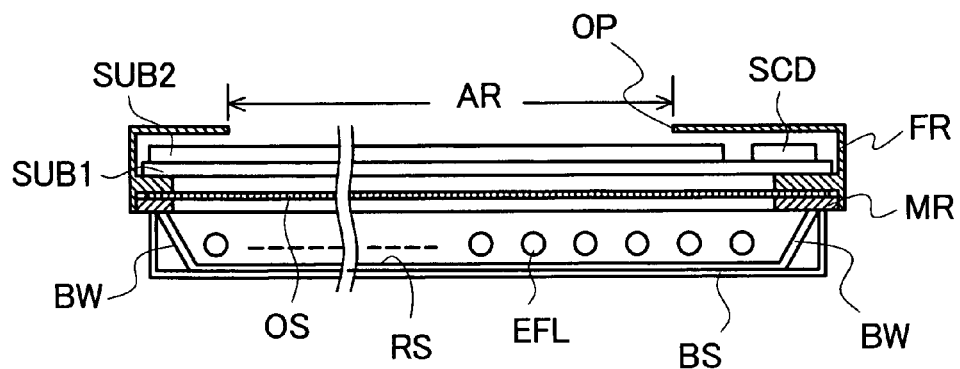
FIG. 3 is a view showing a cross section of the liquid crystal display device formed in a module.

The liquid crystal display panel PNL, the optical sheet OS and the backlight BL are, as shown in FIG. 3, accommodated in the inside of an upper frame FR and an intermediate frame MR and constitute a liquid crystal display device formed into a module. FIG. 3 is a cross-sectional view of the liquid crystal display device formed into a module and shows a cross section of a, portion taken along a line III-III in FIG. 2. On a viewer's side, at least an opening OP which exposes the liquid crystal display region AR of the liquid crystal display panel PNL is formed in the upper frame FR. In the upper frame FR, the liquid crystal display panel PNL, the optical sheet OS and the backlight BL are positioned and accommodated with sufficient accuracy. Here, although the semiconductor devices SCD are formed on the substrate SUB1 in this embodiment, the semiconductor devices SCD may be formed on a flexible printed circuit board. In this case, the semiconductor devices SCD can be arranged in a vertically bending manner in FIG. 3 thus realizing narrowing of a picture frame.

Figure 4A:
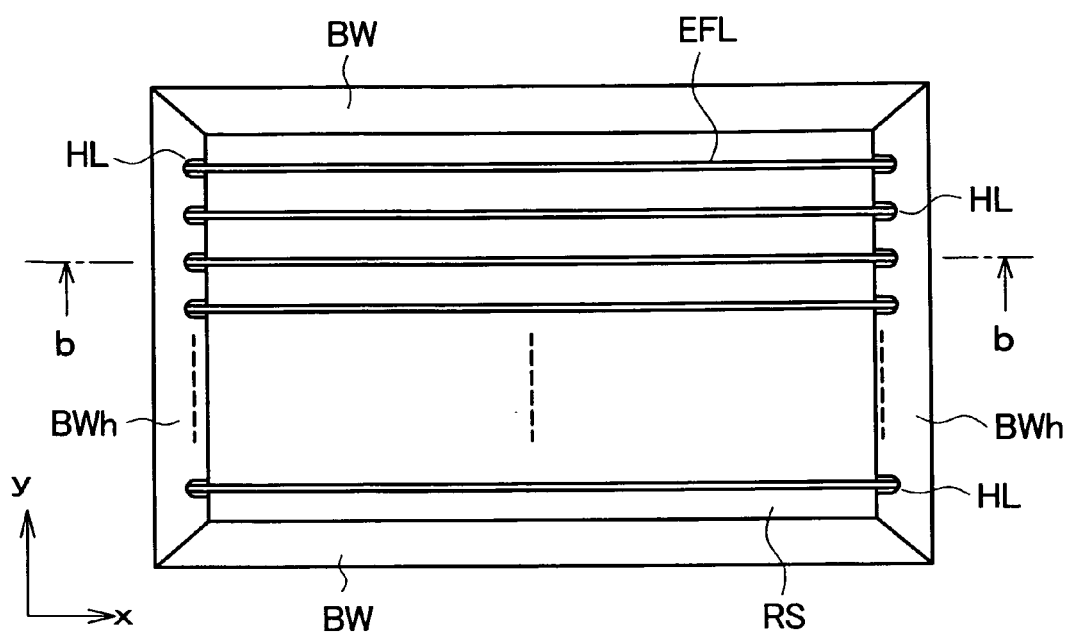
FIG. 4A and FIG. 4B are constitutional views showing an embodiment of a backlight mounted on the liquid crystal display device.
Figure 4B:
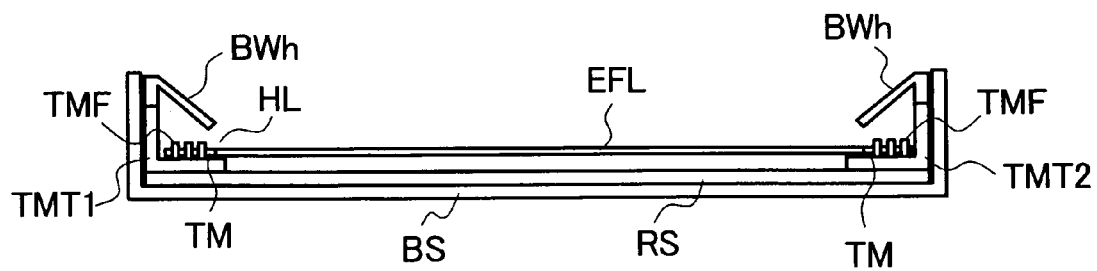

FIG. 4A is a plan view showing only the backlight BL, and FIG. 4B is a cross-sectional view taken along a line b-b in FIG. 4A.

The side wall plates BWh are mounted-on the lower frame BS by interposing electrode support bases TMT described later therebetween, and the electrode support base TMT is made of a resin material, for example. Further, holes HL are formed in a lower-frame-BS side of the side wall plate BWh in parallel to each other. The electrodes TM which are formed on respective ends of the external electrode fluorescent lamps EFL arranged through the respective holes HL are positioned on a back surface side of the side wall plates BWh.

The respective electrodes TM of external electrode fluorescent lamp EFL are clamped by (engaged with) electrode fittings TMF arranged on the electrode support base TMT. Due to such a constitution, each external electrode fluorescent lamp EFL is supported on the lower frame BS by the electrode fittings TMF and, at the same time, a power source is supplied to the external electrode fluorescent lamp EFL through the electrode fittings TMF.

Figure 5:
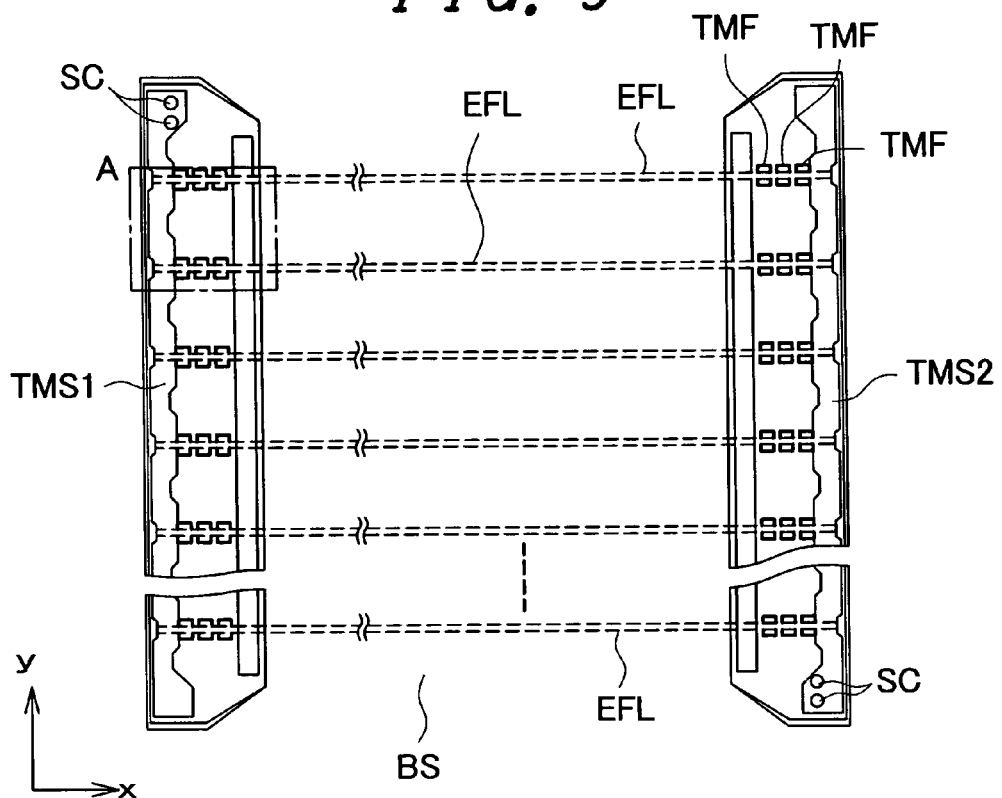
FIG. 5 is an overall plan view showing one embodiment of electrode support members.

The electrode fittings TMF are integrally formed with electrode support members TMS1, TMS2 made of the same metal respectively arranged on both end sides of the respective external electrode fluorescent lamps EFL. FIG. 5 is a plan view showing the above-mentioned electrode support members TMS1, TMS2. The respective support members TMS1, TMS2 are arranged on the respective electrode support bases TMT (indicated by symbols TMT1, TMT2 in the drawing).

In FIG. 5, one electrode support member TMS1 is arranged on a left side (in the drawing) of a region where the external electrode fluorescent lamps EFL are arranged (indicated by a dotted line in the drawing), and another electrode support member TMS2 is arranged on a right side (in the drawing) of the region: These electrode support members TMS1, TMS2 are respectively configured to extend in the y direction in the drawing. That is, the electrode support member TMS1 is configured to support portions of the electrodes TM arranged on left-side ends of the external electrode fluorescent lamps EFL in the drawing, and electrode support member TMS2 is configured to support portions of the electrodes TM arranged on right-side ends of the external electrode fluorescent lamps EFL in the drawing.

Further, the electrode support member TMS1 arranges three electrode fittings TMF thereon in the longitudinal direction of the left-side electrode TM of the external electrode fluorescent lamp EFL in the drawing. The electrode fittings TMF clamp the electrode TM so as to support the external electrode fluorescent lamps EFL. In the same manner, the electrode support member TMS2 arranges three electrode fittings TMF thereon in the longitudinal direction of the right-side electrode TM of the external electrode fluorescent lamp EFL in the drawing. The electrode fittings TMF clamp the electrode TM so as to support the external electrode fluorescent lamp EFL. With such a provision, even when at least one electrode fitting TMF exhibits an insufficient electrical contact, a sufficient electrical contact can be ensured by other remaining electrode fittings TMF.

With respect to the electrode support members TMS1, TMS2, between a pair of extending connection portions JC arranged to face each other in an opposed manner, groups of electrode fittings each constituted of a plurality of electrode fittings TMF are arranged in parallel to each other in the direction intersecting these connection portions JC and are arranged in parallel to each other in the extending direction of the connection portions JC.

Further, these electrode support members TMS1, TMS2 are formed by press-forming a sheet material, for example.

Figure 6A:
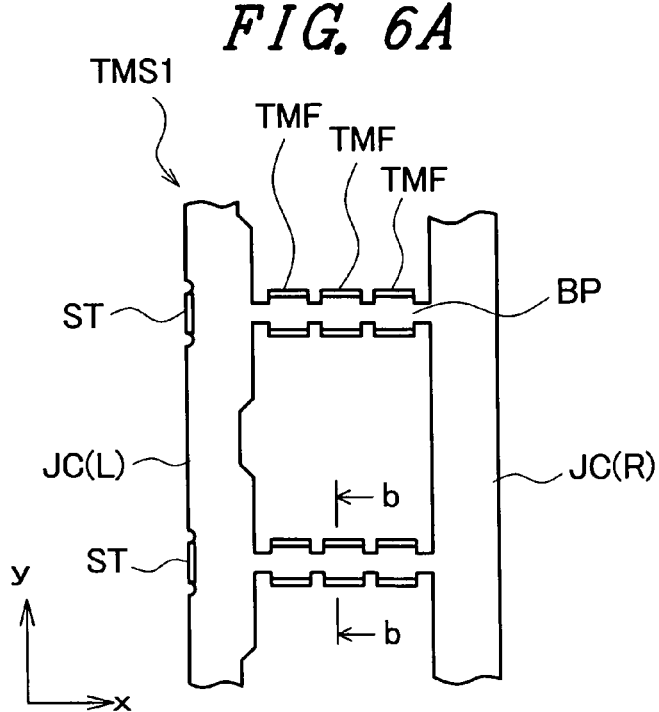
FIG. 6A and FIG. 6B are enlarged views showing an essential part of the electrode support member.

FIG. 6A is an enlarged view depicted by extracting the electrode support member TMS1 in a portion of a dotted frame A shown in FIG. 5. In FIG. 6A, the electrode support member TMS1 includes base portions BP each of which fixes three electrode fittings TMF arranged in parallel to each other thereto in common and a left-side connection portions JC(L) and a right-side connection portion JC (R) to which both end sides of the respective base portions BP are connected in common. These base portions BP and the respective connection portion JC(L), JC(R) form a ladder-shaped pattern as viewed in a plan view. The number n of the rod-shaped light sources may be determined based on a size of a liquid crystal panel or the required brightness. Once the number n of the rod-shaped light sources is determined, the number R of intervals between the neighboring electrode fittings is determined. That is, the number R of the gaps between the neighboring electrode fittings is set to n−1.

Figure 6B:
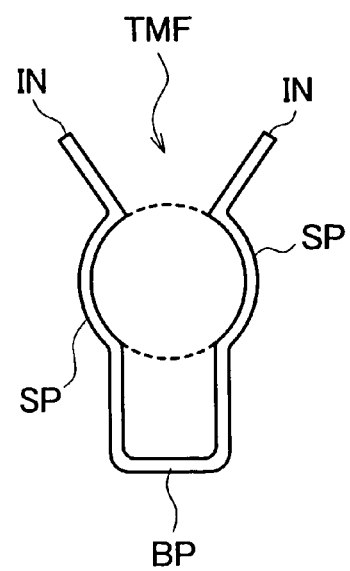

Further, FIG. 6B is a cross-sectional view showing the electrode fitting TMF taken along a line b-b in FIG. 6A. The electrode fitting TMF has the bifurcated structure including a pair of opposedly facing tongues for clamping the external electrode fluorescent lamp EFL from both sides. That is, the electrode fitting TMF includes a pair of support portions SP bent in the vertical direction from both sides of the base portion BP. These support portions SP have an arcuate portion which pushes the external electrode fluorescent lamp EFL from a side opposite to a peripheral surface of the external electrode fluorescent lamps EFL. Further, the electrode fitting TMF includes introduction portions IN. These introduction portions IN facilitate the introduction of the external electrode fluorescent lamp EFL into the electrode fitting TMF. Here, a circle indicated by a dotted line in FIG. 6B indicates the peripheral surface of the external electrode fluorescent lamp EFL.

Further, the electrode support member TMS1 having such a constitution has, as shown in FIG. 5, one end side thereof fixed to the electrode support base TMT1 using screws SC, for example.

To assume a case where the electrode support member TMS1 has both ends thereof fixed to the electrode support base TMT1, for example, when the thermal expansion of the electrode support member TMS1 is generated due to heat from the external electrode fluorescent lamps EFL, the electrode support member TMS1 is deflected and is floated and separated from a surface of the electrode support base TMT1 between the fixed portions. To prevent such a phenomenon, the electrode support member TMS1 has only one end side thereof fixed to the electrode support base TMT1. That is, by fixing only one end side of the electrode support member TMS1, the elongation of the electrode support member TMS1 attributed to the thermal expansion gives rise to the elongation of another end side of the electrode support member TMS1 thus suppressing the deflection of the electrode support member TMS1.

Further, the electrode support member TMS1 which has only one end side thereof fixed to the electrode support base TMT1 is prevented from being floated and separated from the surface of the electrode support base TMT1 with the use of projecting members PJ(L), PJ(S) described later formed on the side wall plate BWh fixed to the electrode support base TMT1.

Figure 7A:
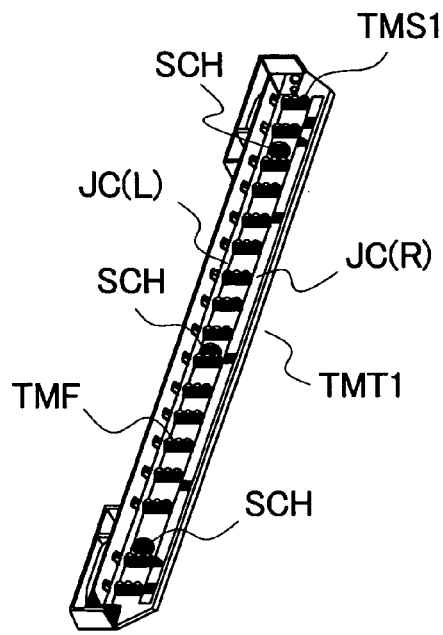
FIG. 7A and FIG. 7B are perspective views showing one embodiment of an electrode support base and a side wall plate fixed to the electrode support base.
Figure 7B:
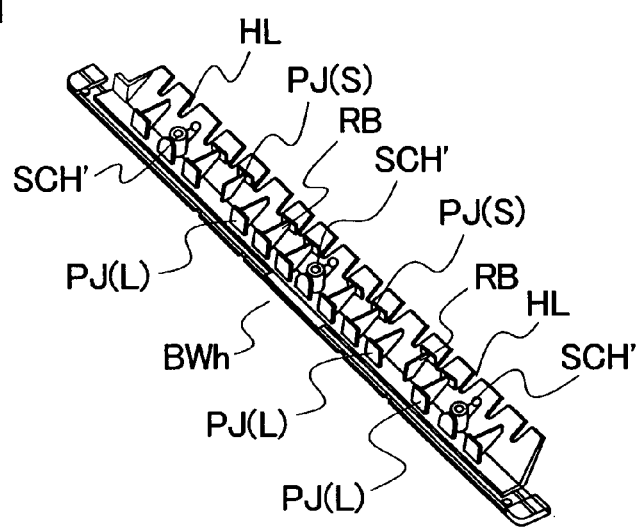

FIG. 7A is a perspective view of the electrode support base TMT1 on which the above-mentioned electrode support member TMS1 is arranged, and FIG. 7B is a perspective view of the side wall plate BWh fixed (temporarily-fixed) to the electrode support base TMT1 in a state that the side wall plate BWh covers the electrode support base TMT1.

In FIG. 7B, the side wall plate BWh is shown as viewed from a back side thereof opposite to a surface thereof which faces the liquid crystal display panel PNL. That is, the side wall plate BWh is fixed (temporarily fixed) to the electrode support base TMT shown in FIG. 7A in a state that the side wall plate BWh covers the electrode support base TMT by reversing a front side and a back side of the side wall plate BWh and, further, reversing a left side and a right side of the side wall plate BWh from a state shown in the drawing.

Here, screw holes SCH arranged in parallel to the longitudinal direction of the electrode support base TMT1 are formed in the electrode support base TMT1, while screw holes SCH' corresponding to the screw holes SCH are also formed in the side wall plate BWh. When the side wall plate BWh is temporarily fixed to the electrode support base TMT1, center axes of the respective screw holes SCH and center axes of the screw holes SCH' are respectively aligned with each other. The electrode support base TMT1 and the side wall plate BWh which are temporarily fixed to each other in such a manner are fixed to the lower frame BS using screws (not shown in the drawing) threadedly inserted into the lower frame BS through the respective screw holes SCH, SCH'.

As shown in FIG. 7B, the holes HL and a plurality of projecting members PJ(S) each of which has a relatively small size are formed on a back surface of the side wall plate BWh in a state that the holes HL and the projecting members PJ(S) are arranged at predetermined intervals along a side of the inclination surface of the side wall plate BWh. Further, on another side of the side wall plate BWh facing the side of the inclination surface, a plurality of projecting members PJ(L) each of which has a relatively large size is formed in a state that the projecting members PJ(L) are arranged at predetermined intervals along the another side of the side wall plate BWh.

The respective projecting members PJ(S) are configured to be arranged above the right connection portion JC(R) of the electrode support member TMS1 and the respective projecting members PJ(L) are configured to be arranged above the left connection portion JC(L) of the electrode support member TMS1 when the side wall plate BWh is temporarily fixed to the electrode support base TMT1. That is, the electrode support member TMS is arranged between the projecting members PJ(S) and the projecting members PJ(L).

With respect to the projecting members PJ(S) and the projecting members PJ(L), to make respective crest portions of the projecting members PJ(S) and the projecting members PJ(L) formed on the side wall plate BWh arranged in an inclined manner with respect to the electrode support member TMS1 have the substantially same height with respect to the electrode support member TMS1, a size of the projecting members PJ(S) and a size of the projecting members PJ(L) are made different from each other.

Here, the respective projecting members PJ(S) are arranged to face the corresponding projecting members PJ(L), and the projecting member PJ(S) and the projecting member PJ(L) which face each other are connected to each other using a rib RB integrally formed with the side wall plate BWh. The ribs RB are provided for enhancing a mechanical strength of the side wall plate BWh against the deformation of the side wall plate BWh.

Figure 8:
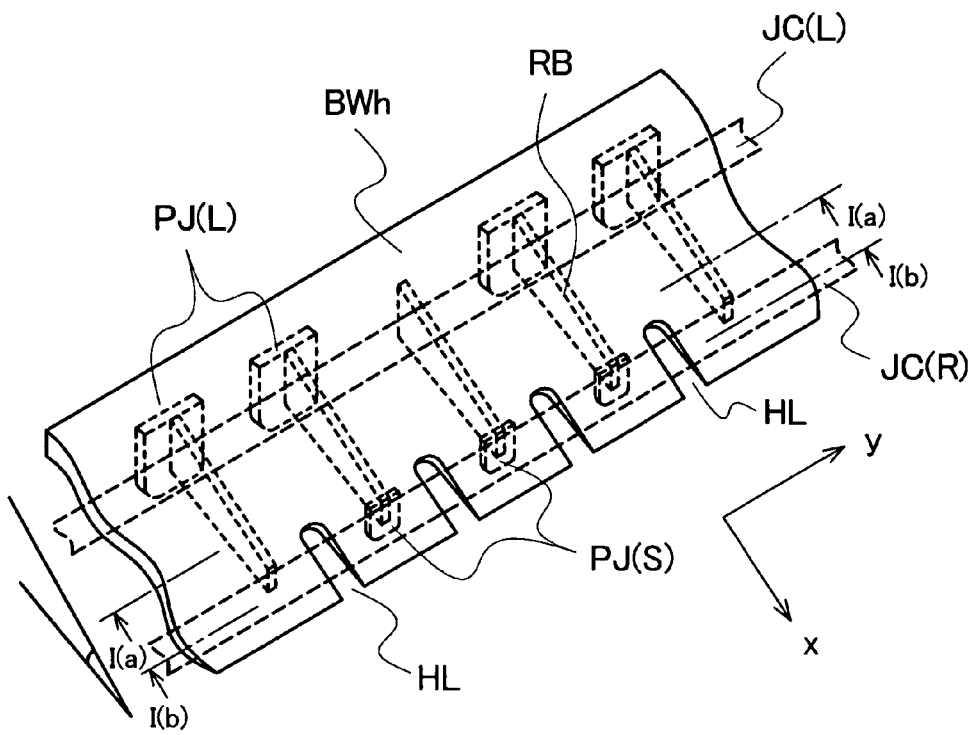
FIG. 8 is a perspective view showing a relationship between projecting members formed on the side wall plate and connection portions of the electrode support member in a see-through manner.

FIG. 8 is a perspective view of the side wall plate BWh as viewed from a side of the liquid crystal display panel PNL. In the drawing, the projecting member PJ(L) and the projecting member PJ(S) and the like are shown in a see-through manner.

Here, when the side wall plate BWh is fixed to the electrode support base TMT, the projecting members PJ(L) are arranged above the left connection portion JC(L) of the electrode support member TMS1, and the projecting members PJ(S) are arranged above the right connection portion JC(R) of the electrode support member TMS1. In FIG. 8, to make the positional relationship of the respective parts clear, the left connection portion JC(L) and the right connection portion JC(R) of the electrode support member TMS1 are shown by a dotted line in the drawing.

The projecting members PJ(L) arranged in parallel to each other in the longitudinal direction (y direction in the drawing) of the side wall plate BWh are respectively formed of a plate having a main surface arranged parallel to the parallel-arrangement direction of the projecting members PJ(L). The projecting member PJ(L) has the crest portion thereof facing the left connection portion JC (L) of the electrode support member TMS1 formed into an arcuate shape. Such a shape is adopted for reducing a friction between the projecting member PJ(L) and the left connection portion JC(L) in a state that the projecting member PJ(L) is brought into contact with the left connection portion JC(L).

The projecting members PJ(S) arranged in parallel to each other in the longitudinal direction (y direction in the drawing) of the side wall plate BWh are also respectively formed of a plate having a main surface parallel to the arrangement direction of the projecting member PJ(S). Further, the projecting member PJ(S) has the crest portion thereof facing the right connection portion JC(R) of the electrode support member TMS1 formed into an arcuate shape. Such a shape is adopted for reducing a friction between the projecting member PJ(S) and the right connection portion JC (R) in a state that the projecting member PJ (S) is brought into contact with the right connection portion JC(R).

Here, in this embodiment, as can be also clearly understood from FIG. 7 and FIG. 8, with respect to the respective projecting members PJ (L) arranged at predetermined intervals, the projecting members PJ(L) are not arranged at some positions. The same goes for the respective projecting members PJ(S).

That is, the number of projecting members PJ(L) or the projecting members PJ(S) which are arranged between the electrode fittings and are brought into contact with the connection portion is set smaller than the number R of intervals between the neighboring electrode fittings.

Figure 1A:
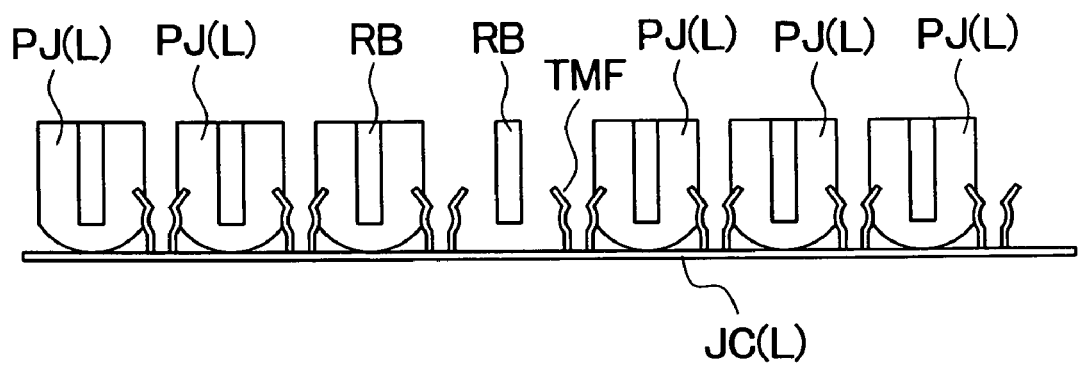

That is, with respect to the respective projecting members PJ(L), as shown in FIG. 1A which is a cross-sectional view taken along a line I(a)-I(a) in FIG. 8, for example, after arranging three projecting members PJ(L) at an equal interval from a right side in the drawing, the position where the projecting member PJ(L) is not formed is provided and, thereafter, three projecting members PJ(L) are arranged at an equal interval parallel to each other. Such an arrangement is repeated. Further, each projecting member PJ(L) is configured to bring the crest portion thereof into contact with the left connection portion JC(L) of the electrode support member TMS1.

Due to such a constitution, the connection portion JC(L) includes the portions which are brought into contact with the projecting members PJ(L) and the portions which are not brought into contact with the projecting members PJ(L) at the positions arranged at the predetermined intervals in the extending direction of the connection portion. JC(L). Accordingly, the portions which can reduce squeals and the portions which can reduce buzzes and rattles can be formed in mixture along the extending direction of the connection portion JC(L) and hence, the liquid crystal display device can reduce squeals, buzzes and rattles as a whole.

Figure 1B:
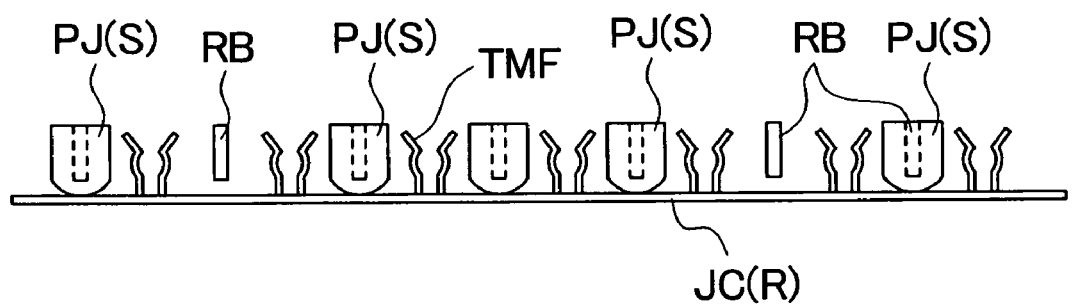

In the same manner, as shown in FIG. 1B which is a cross-sectional view taken along a line I(b)-I(b) in FIG. 8, each projecting member PJ(S) is arranged with a displacement of two pitches relative to the projecting member PJ(L). For example, after arranging three projecting members PJ(S) at an, equal interval toward a left side in the drawing in parallel to each other, one position where the projecting member PJ(S) is not formed is provided and, thereafter, three projecting members PJ(S) are arranged at an equal interval parallel to each other. Such an arrangement is repeated. Each projecting member PJ(S) is configured to bring the crest portion thereof into contact with the right connection portion JC(R) of the electrode support member TMS1.

Due to such a constitution, the connection portion JC(R) also includes the portions which are brought into contact with the projecting members PJ(S) and the portions which are not brought into contact with the projecting members PJ(S) at the positions arranged at the predetermined intervals in the extending direction of the connection portion JC(R). Accordingly, the portions which can reduce squeals and the portions which can reduce buzzes and rattles can be formed in mixture along the extending direction of the connection portion JC(R) and hence, the liquid crystal display device can reduce squeals, buzzes and rattles as a whole.

Further, with respect to the projecting members PJ(L), after arranging, for example, three projecting members PJ(L) at an equal interval parallel to each other from a right side in FIG. 1, one position where the projecting member PJ(L) is not formed is arranged and, thereafter, three projecting members PJ(L) are arranged at an equal interval parallel to each other. That is, the portions of the connection portion JC(L) which are brought into contact with the projecting members PJ(L) and the portions of the connection portion JC(L) which are not brought into contact with the projecting member PJ(L) are uniformly distributed along the extending direction of the connection portion JC(L) Accordingly, the liquid crystal display device can uniformly reduce squeals, buzzes and rattles along the extending direction of the connection portion JC(L).

Further, also with respect to the projecting member PJ(S), portions of the connection portion JC(R) which are brought into contact with the projecting members PJ(S) and the portions of the connection portion JC(R) which are not brought into contact with the projecting member PJ(S) are uniformly distributed along the extending direction of the connection portion JC(R). Further, in this arrangement, the projecting members PJ(S) are arranged with a displacement of two pitches, for example, with respect to the projecting members PJ(L). Due to such a constitution, the portion of another connection portion JC(R) facing the portion of one connection portion JC(L) which is not brought into contact with the projecting member PJ(L) can be used as a portion which is brought into contact with the projecting member PJ(S). This implies that it is possible to uniformly push the electrode support member TMS including the pair of connection portions JC (L), JC(R) to the electrode support base TMT using the projecting members PJ(L), PJ(S).

Figure 9A:
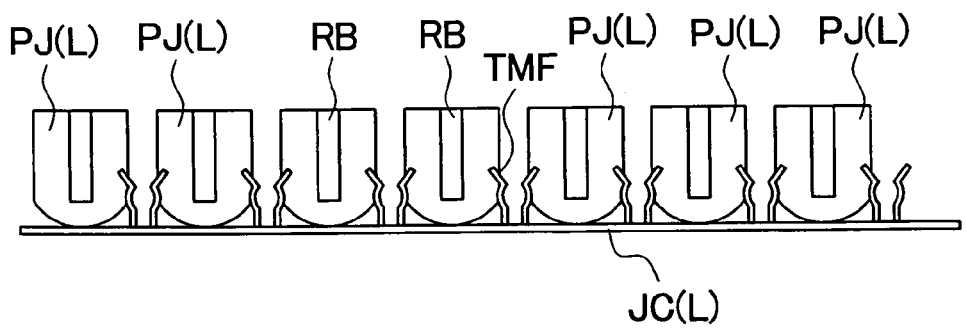
FIG. 9A and FIG. 9B are cross-sectional views of an essential part showing another embodiment of the liquid crystal display device according to the present invention.
Figure 9B:
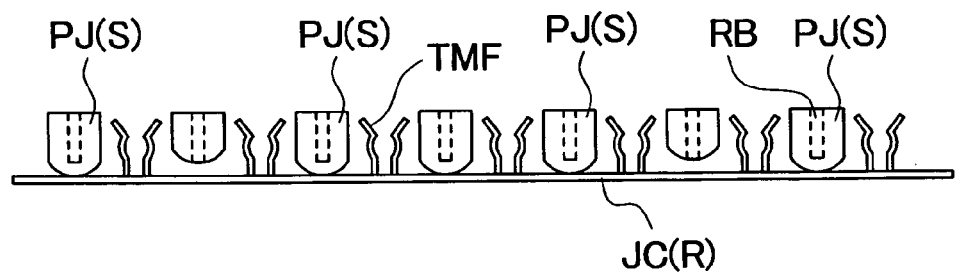

In the embodiment shown in FIG. 1, at the positions where the connection portions JC(L), JC(R) are not brought into contact with the projecting members PJ(L) and the projecting members PJ(S), the projecting member PJ(L) and the projecting member PJ(S) corresponding to the side wall plate BWh are not formed. However, as in the case of another embodiment shown in FIG. 9 corresponding to FIG. 1, the respective projecting members PJ(L) and the respective projecting members PJ(S) are formed at equal intervals, and the projecting members PJ(L) which are not required to be in contact with the connection portion JC(L) may have crest portions thereof disposed in a spaced-apart manner from the connection portion JC(L). Further, the projecting members PJ(S) which are not required to be in contact with the connection portion JC(R) may have crest portions thereof disposed in a spaced-apart manner from the connection portion JC(R).

The connection portion includes portions which are brought into contact with the projecting members and portions which are not brought into contact with the projecting members at positions arranged at predetermined intervals in the extending direction of the connection portion.

In this embodiment, the side wall plate includes the projecting portions which are brought into contact with the connection portion and the projecting portions which are not brought into contact with the connection portion.

Figure 10A:
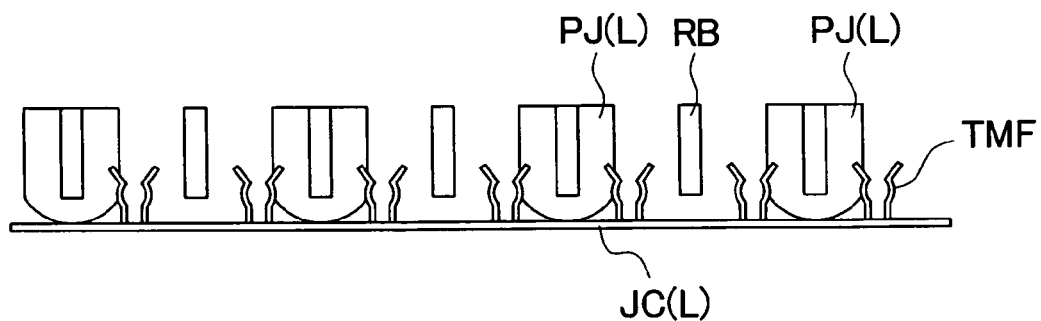
FIG. 10A and FIG. 10B are cross-sectional views of an essential part showing another embodiment of the liquid crystal display-device according to the present invention.
Figure 10B:
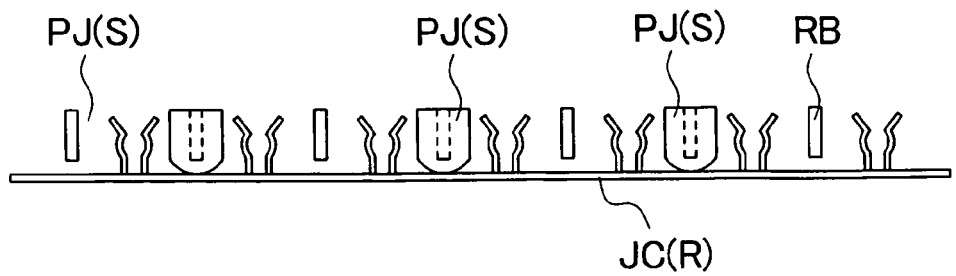

Further, in the above-mentioned embodiment, with respect to the projecting member PJ(L), for example, after arranging three projecting members PJ(L) at the equal interval parallel to each other, for example, one position where the projecting member PJ(L) is not formed is disposed and, thereafter, three projecting members PJ(L) are arranged at the equal interval parallel to each other. However, the number of projecting members PJ(L) may be determined arbitrarily, and may be set to the appropriate number by taking a balance between the reduction of squeals and the reduction of buzzes and rattles into consideration. Accordingly, as shown in FIG. 10 corresponding to FIG. 1, with respect to the projecting-members PJ(L), for example, it is needless to say that the projecting member PJ(L) may be arranged every one other by providing positions where the projecting member PJ(L) is not formed.

Further, in the above-mentioned embodiments, the external electrode fluorescent lamps EFL are used as the light sources of the backlight BL. However, the light source is not limited to the external electrode fluorescent lamp and may be constituted of a rod-shaped light source which is similar to the external electrode fluorescent lamp in shape.

The above-mentioned respective embodiments may be adopted in a single form or in combination. This is because the advantageous effect of the respective embodiments can be acquired independently or synergistically.

What is claimed is:

1. A liquid crystal display device comprising:
   a liquid crystal display panel; and
   a backlight arranged on a back surface of the liquid crystal display panel, wherein
   the backlight includes a plurality of rod-shaped light sources arranged in parallel in a plane facing the liquid crystal display panel in an opposed manner, electrode fittings for holding electrode portions of the rod-shaped light sources, side wall plates covering the electrode portions, and a lower frame accommodating the rod-shaped light sources,
   the electrode fittings are connected to a connection portion extending in the parallel arrangement direction of the rod-shaped light sources,
   wherein the connection portion includes first connection portion arranged at one side of the electrode fitting and second connection portion arranged at the other side of the electrode fitting, and
   an inner edge of the first connection portion is straight and an inner edge of the second connection portion is not straight.

2. The liquid crystal display device according to claim 1, wherein the not straight portion of the second connection portion is dent.

3. The liquid crystal display device according to claim 2, wherein outer edge of the second connection portion has not straight portion.

4. The liquid crystal display device according to claim 3, wherein the not straight portion of the outer edge of the second connection portion is dent.

5. The liquid crystal display device according to claim 1, wherein the second connection portion has dent alternatively at inner side and outer side.

6. The liquid crystal display device according to claim 5, wherein dent of outer side of the second connection portion faces to the electrode fitting.

* * * * *